United States Patent
Ouchi et al.

(10) Patent No.: US 11,711,124 B2
(45) Date of Patent: Jul. 25, 2023

(54) TRANSMITTER, RECEIVER, TRANSMISSION METHOD, RECEPTION METHOD, NON-TRANSITORY COMPUTER READABLE STORAGE MEDIUM, AND INTEGRATED CIRCUIT

(71) Applicant: Panasonic Holdings Corporation, Osaka (JP)

(72) Inventors: Mikihiro Ouchi, Osaka (JP); Tomohiro Kimura, Osaka (JP); Takayuki Sotoyama, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

(21) Appl. No.: 17/705,105

(22) Filed: Mar. 25, 2022

(65) Prior Publication Data
US 2022/0321184 A1  Oct. 6, 2022

(30) Foreign Application Priority Data
Mar. 31, 2021 (JP) ................. 2021-060311

(51) Int. Cl.
H04B 7/06    (2006.01)
H04B 7/0426  (2017.01)
H04B 1/00    (2006.01)

(52) U.S. Cl.
CPC ......... *H04B 7/0606* (2013.01); *H04B 1/0007* (2013.01); *H04B 1/0053* (2013.01); *H04B 7/043* (2013.01)

(58) Field of Classification Search
CPC .... H04B 1/0007; H04B 1/0053; H04B 7/043; H04B 7/0606; H04B 7/0617; H04B 7/086
See application file for complete search history.

(56) References Cited

U.S. PATENT DOCUMENTS

2012/0001810 A1   1/2012  Soualle et al.
2015/0364819 A1*  12/2015 Ngo ................... H01Q 21/0093
                                              342/368

FOREIGN PATENT DOCUMENTS

JP    6-237928 A     8/1994
JP    2010-540894 A  12/2010

OTHER PUBLICATIONS

Suyama et al., "5G Multi-antenna Technology," NTT DOCOMO Technical Journal, vol. 17, No. 4, Jan. 2016, pp. 30-39 (with English translation),.

(Continued)

*Primary Examiner* — David S Huang
(74) *Attorney, Agent, or Firm* — Seed IP Law Group LLP

(57) ABSTRACT

A transmitter supports beamforming function using a plurality of antenna elements. The transmitter includes a dither signal generator which, in operation, generates pseudo random sequence signals as dither signals for lower bits of digital signals, the pseudo random sequence signals being different from each other, the digital signals each corresponding to respective one of the plurality of antenna elements, and a plurality of digital-to-analog converters which, in operation, adds the dither signals generated by the dither signal generator to the lower bits of the digital signals, and converts only upper bits of addition results of the digital signals and the dither signals into analog signals.

21 Claims, 14 Drawing Sheets

(56) References Cited

OTHER PUBLICATIONS

Suzuki et al., "Development of 38GHz-band Wireless Communication System Using High Altitude Platform Station (HAPS) for 5G Network—Study on broadband backhaul communication link for 5G network—," The Institute of Electronics, Information and Communication Engineers (IEICE), 2021 IEICE Conference, 2021, B-3-1, Mar. 2021, 2 pages.

* cited by examiner

TRANSMITTER, RECEIVER, TRANSMISSION METHOD, RECEPTION METHOD, NON-TRANSITORY COMPUTER READABLE STORAGE MEDIUM, AND INTEGRATED CIRCUIT

BACKGROUND

1. Technical Field

The present disclosure relates to a transmitter, a receiver, a transmission method, a reception method, a non-transitory computer readable storage medium, and an integrated circuit having a function of performing beamforming in wireless transmission.

2. Background Art

One of the main technologies of a 5G mobile communication system is a 5G multi-antenna technology (Suyama et al. "5G multi-antenna technology", NTT DOCOMO Technical Journal, Vol. 23 No. 4, pp. 30-39 (January 2016) (hereinafter, Non-Patent Literature 1)). In the 5G multi-antenna technology, a propagation loss in a high frequency band is compensated by beamforming that adaptively controls antenna directivity by using a super multi-element antenna. Beamforming is roughly classified into the following three types (Chapter 3.3 of Non-Patent Literature 1);

(1) Full digital beamforming;
(2) Full analog beamforming; and
(3) Hybrid beamforming.

(1) Full digital beamforming is excellent in performance due to digital precoding processing, but requires the same number of digital-to-analog converters (DACs) and up converters (UCs) as the number of antenna elements. For this reason, in the high frequency band, the cost is high, and the power consumption is comparatively high.

(2) Full analog beamforming requires no digital precoding processing and thus has the simplest circuit configuration, but requires a reduction in the number of beams and generation of narrow beams in order to maintain orthogonality between beams.

(3) Hybrid beamforming is performed with a combination of digital and analog ways, and thus both performance and complexity of a circuit configuration are intermediate between (1) full digital beamforming and (2) full analog beamforming.

An environmental arrangement and a technical development have progressed internationally for commercialization of High-Altitude Platform Station (HAPS). Thus, its widespread adoption is expected. In particular, regarding a fixed communication system using HAPS, expectations for achievement in securing a redundant route of a backhaul line via the sky are increasing. It is expected to achieve a high-speed and large-capacity HAPS system in cooperation with a 5G network in a 38 GHz band distributed to HAPS by World Radio Communication Conference in 2019 (WRC-19) (Suzuki et al. "Development of 38 GHz-band wireless communication system in cooperation with 5G network using high altitude platform (HAPS)—Study on high-speed and large-capacity backhaul line of—5G network", the Institute of Electronics, Information and Communication Engineers (IEICE) General Conference, 2021, B-3-1 (March 2021)). Since the HAPS flies while circling around the circumference in the stratosphere near an altitude of 20 km, the HAPS performs beamforming with a ground station and follows the ground station. In the HAPS, a super multielement antenna is required in order to compensate for a propagation loss in a high frequency band. However, in the HAPS driven by a solar cell, power consumption becomes a problem, and this problem becomes evident particularly when (1) full digital beamforming is adopted for securing performance.

As one method for reducing power consumption, a reduction in the number of bits of DAC is exemplified in transmission beamforming, and a reduction in the number of bits of an analog-to-digital converter (ADC) is exemplified in reception beamforming. In order to reduce the influence of a quantization error at the time of the reduction in the number of bits, a dither technology is applied to reception beamforming in Unexamined Japanese Patent Publication No. H06-237928. When an ADC output is represented by an integer, an analog input of 1.51 is quantized to a digital output of 2, and the quantization error is 0.49. Amplitudes of −0.375, −0.125, 0.125, and 0.375 are generated as pseudo noises (dither signals) with four sample clocks forming one cycle, and adds the analog input of 1.51 to the amplitudes. As a result, the analog input of 1.51 is converted into 1.135, 1.385, 1.635, or 1.885 with an equal probability of ¼ at a time, and an average of quantization errors can be 0.

In addition, in any of the above (1) to (3) beamforming, in phase (delay) control of each antenna element, calibration between elements is important because analog circuit characteristics between elements vary. In particular, the stratosphere near the altitude of 20 km where HAPS stays has a cryogenic temperature of −70° C. and a severe environment of 1/10 atmospheric pressure. Thus, a real-time characteristic and a high-speed characteristic of the calibration between elements are required.

In Japanese Translation of PCT International Application Publication No. 2010-540894, a pseudo random sequence is added to a main signal, a resultant signal is transmitted from an array antenna, and received by a reception array antenna. Then, a correlation between the pseudo random sequence identical to that on the transmission side and the received signal is obtained. As a result, a characteristic for each antenna element is calculated, thereby performing the calibration between the elements. This enables real-time calibration without stopping the main signal.

SUMMARY

As described above, in a fixed communication system using an HAPS, achievement in high speed and large capacity in the 38 GHz band is expected. However, in the case of using the 38 GHz band in which a rainfall attenuation is large, it is assumed that the ultra-multielement antenna is originally used to compensate for a propagation loss in the high frequency band, and the number of elements needs to be further increased in order to secure a sufficient margin for the rainfall attenuation. Thus, the problem of power consumption becomes more evident.

One non-limiting and exemplary embodiment facilitates providing a transmitter, a receiver, a transmission method, a reception method, a non-transitory computer readable storage medium, and an integrated circuit that enable sophisticated and low power beamforming.

The transmitter of the present disclosure supports a beamforming function using a plurality of antenna elements. The transmitter includes a dither signal generator which, in operation, generates pseudo random sequence signals as dither signals for lower bits of digital signals, the pseudo random sequence signals being different from each other, the digital signals each corresponding to respective one of the plurality of antenna elements, and a plurality of digital-to-analog converters which, in operation, adds the dither signals generated by the dither signal generator to the lower bits of the digital signals, and converts only upper bits of addition results of the digital signals and the dither signals into analog signals.

The receiver of the present disclosure supports beamforming function using a plurality of antenna elements. The receiver includes a dither signal generator which, in operation, generates pseudo random sequence signals as dither signals for analog signals, the pseudo random sequence signals being different from each other, the analog signals each corresponding to respective one of the plurality of antenna elements, and a plurality of analog-to-digital converters which, in operation, receives the analog signals and the dither signals, adds the dither signals to the analog signals, the dither signals having power level corresponding to lower bits of digital signals, converts only portions of addition results of the analog signals and the dither signals into the digital signals, the portions corresponding to upper bits of the digital signals, and outputs the digital signals.

The transmission method of the present disclosure supports beamforming function using a plurality of antenna elements. The transmission method includes generating pseudo random sequence signals as dither signals for lower bits of digital signals, the pseudo random sequence signals being different from each other, the digital signals each corresponding to respective one of the plurality of antenna elements, adding the dither signals generated by the generating of the pseudo random sequence signals to the lower bits of the digital signals, and performing conversion into analog signals on only upper bits of addition results of the digital signals and the dither signals.

The reception method of the present disclosure supports beamforming function using a plurality of antenna elements. The reception method includes generating pseudo random sequence signals as dither signals for analog signals, the pseudo random sequence signals being different from each other, the analog signals each corresponding to respective one of the plurality of antenna elements, and receiving the analog signals and the dither signals, adding the dither signals to the analog signals, the dither signals having power level corresponding to lower bits of digital signals, converting only portions of addition results of the analog signals and the dither signals into the digital signals, the portions corresponding to upper bits of the digital signals, and outputting the digital signals.

It should be noted that general or specific embodiments may be implemented as a system, an apparatus, a method, an integrated circuit, a computer program, a storage medium, or may be implemented as any combination of a system, an apparatus, a method, an integrated circuitry, a computer program, and a recording medium.

According to an exemplary embodiment of the present disclosure, the number of bits of DAC or ADC can be reduced while the influence of the quantization error is prevented by generating the dither signal using a simple method. Thus, sophisticated and low power beamforming can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION OF PREFERRED EMBODIMENTS

Hereinafter, exemplary embodiments of the present disclosure will be described in detail with reference to the drawings as appropriate. However, a more detailed description than necessary may be omitted. For example, the detailed description of already well-known matters and the redundant description of a configuration substantially identical to the already-described configuration may be omitted. This is to prevent the following description from being unnecessarily redundant and to facilitate understanding by those skilled in the art.

Note that the attached drawings and the following description are provided for those skilled in the art to fully understand the present disclosure, and are not intended to limit the subject matter described in the appended claims.

First Exemplary Embodiment

Figure 1:
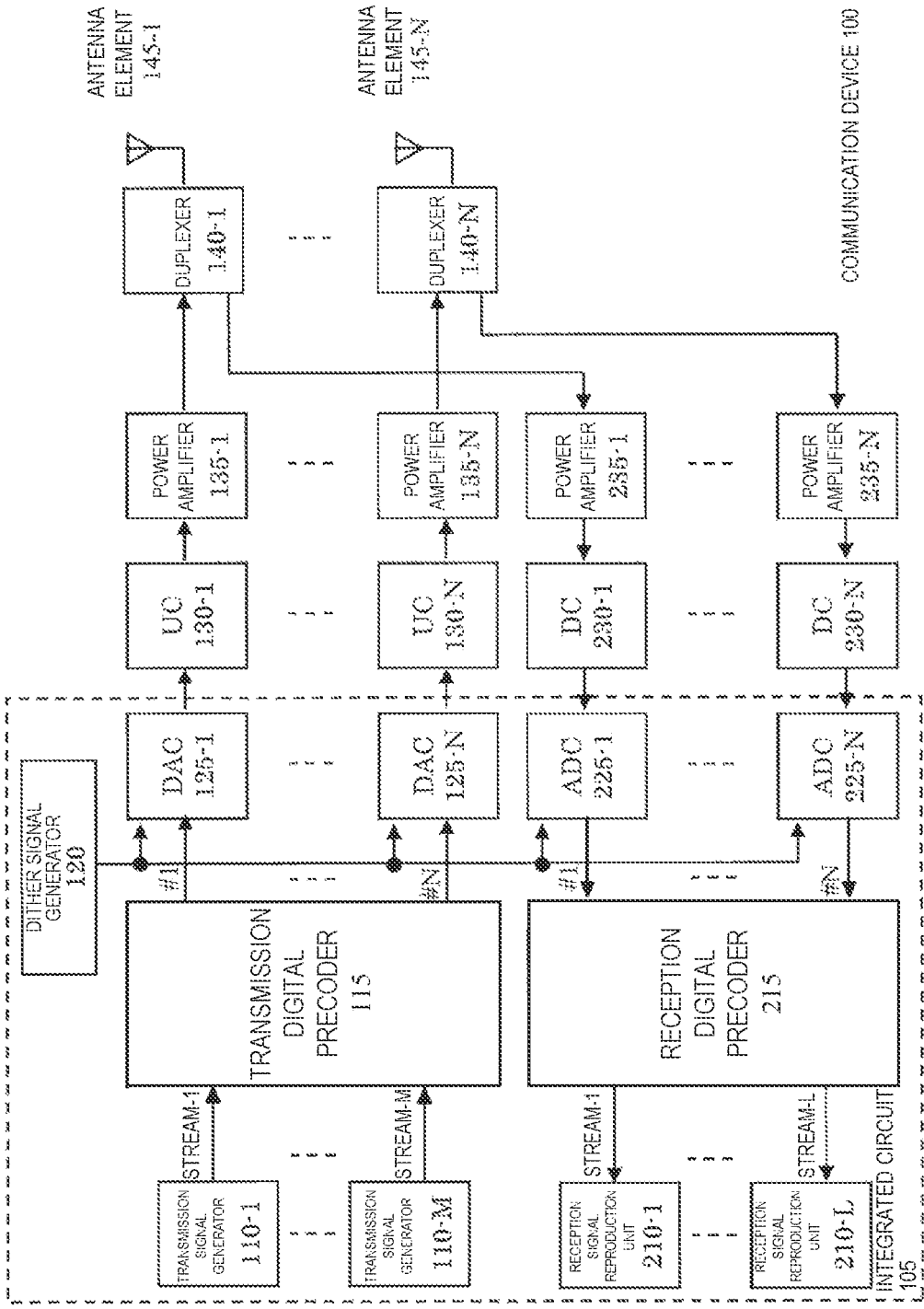
FIG. 1 is a diagram illustrating a configuration of a communication device according to a first exemplary embodiment of the present disclosure.

FIG. 1 is a diagram illustrating a configuration of communication device 100. Communication device 100 includes M transmission signal generators 110-1 to 110-M, transmission digital precoder 115, dither signal generator 120, N digital-to-analog converters (DACs) 125-1 to 125-N, N up converters (UCs) 130-1 to 130-N, N power amplifiers 135-1 to 135-N, N duplexers 140-1 to 140-N, N antenna elements 145-1 to 145-N, L reception signal reproduction units 210-1 to 210-L, reception digital precoder 215, N analog-to-digital converters (ADCs) 225-1 to 225-N, N down converters (DCs) 230-1 to 230-N, and N power amplifiers 235-1 to 235-N. Note that, in communication device 100, components that perform digital processing may be integrated circuit 105. Examples of the components that perform the digital processing include transmission signal generators 110-1 to 110-M, transmission digital precoder 115, dither signal generator 120, DACs 125-1 to 125-N, reception signal reproduction units 210-1 to 210-L, reception digital precoder 215, and ADCs 225-1 to 225-N. Note that integrated circuit 105 may include not only components that perform the digital processing but also some or all of the components that perform analog processing.

The transmission side in the operation of communication device 100 in FIG. 1 will be described below. Transmission signal generators 110-1 to 110-M generate transmission streams 1 to M, respectively. Transmission digital precoder 115 performs digital precoding for beamforming on M inputs, and generates N digital signals (main signals) respectively corresponding to the N antenna elements, respectively. Dither signal generator 120 generates a dither signal. Each of DACs 125-1 to 125-N convert a digital signal into an analog signal by also using a dither signal. Each of UCs 130-1 to 130-N up-converts the analog signal to a transmission frequency band. Each of power amplifiers 135-1 to 135-N amplifies the power of the up-converted analog signal. The analog signals output from power amplifiers 135-1 to 135-N pass through duplexers 140-1 to 140-N and are output as transmission signals from N antenna elements 145-1 to 145-N, respectively.

Figure 2:
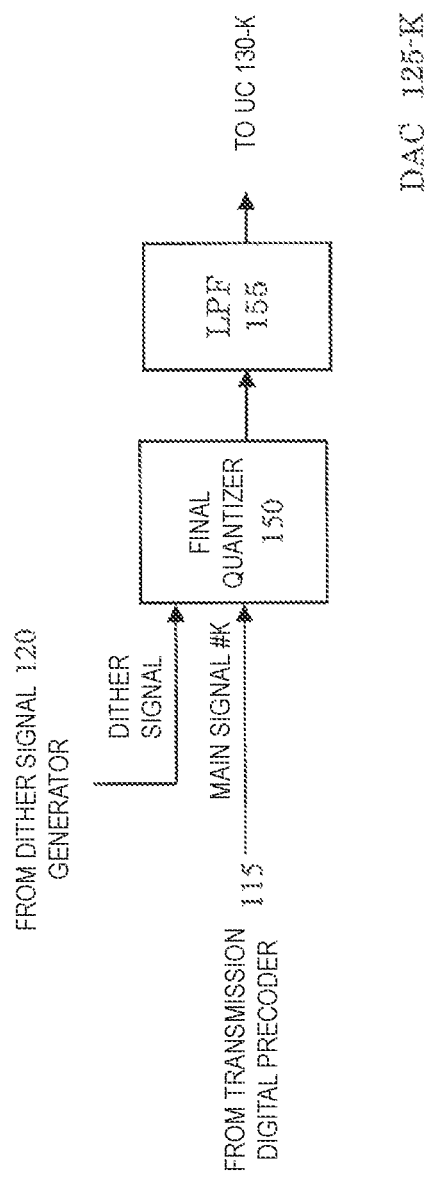
FIG. 2 is a diagram illustrating a configuration of a digital-to-analog converter (DAC) using $\Delta\Sigma$ conversion as an example in the first exemplary embodiment of the present disclosure.

FIG. 2 is a diagram illustrating a configuration of DAC 125-K using $\Delta\Sigma$ conversion as an example. DAC 125-K includes final quantizer 150 and low pass filter (LPF) 155. In DAC 125-K in FIG. 2, final quantizer 150 performs final quantization before analog conversion by using the digital signal (main signal) corresponding to antenna element K output from transmission digital precoder 115 and the dither signal output from dither signal generator 120. LPF 155 passes only a low-pass signal in the digital signal output from final quantizer 150, converts the low-pass signal into an analog signal, and outputs the analog signal to UC 130-K.

Figure 3:
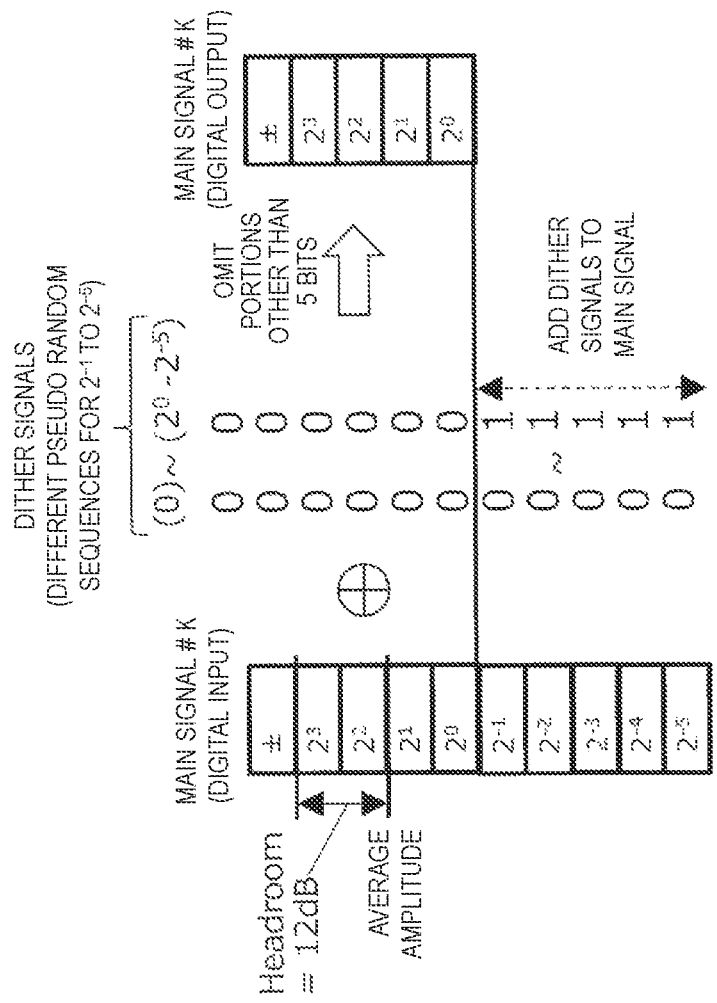
FIG. 3 is a diagram illustrating an example of operations of a final quantizer and a dither signal generator according to the first exemplary embodiment of the present disclosure.

FIG. 3 is a diagram illustrating an example of operations of final quantizer 150 and dither signal generator 120. In this example, the main signal to be input to final quantizer 150 is a 10-bit digital signal. Of the 10-bit digital signal, 1-bit for a sign and 2-bit ($2^3$ to $2^2$) are set above the average amplitude in order to secure 12 dB as a headroom. The remaining 7-bit portions are expressed by $2^1$ to $2^{-5}$. Dither signal generator 120 generates different pseudo random sequences for $2^{-1}$ to $2^{-5}$ as dither signals. Final quantizer 150 adds the 10-bit main signals and the different pseudo random sequences {0 or 1} for $2^{-1}$ to $2^{-5}$, truncates lower 5-bit portions, and outputs addition results to LPF 155 as 5-bit digital signals. Note that the pseudo random sequences are, for example, M-sequences or Gold sequences, and can be used as dither signals by generating 0 and 1 with approximately equal probability. Therefore, final quantizer 150 adds 0 to $2^0$-$2^{-5}$ generated with approximately equal probability to the 10-bit main signals, and truncates the lower 5-bit portions.

The above configuration enables generation of the dither signals in a simple method. Therefore, the configuration can provide the transmitter that reduces the number of bits of the DACs while preventing the influence of a quantization error and enables sophisticated and low power beamforming.

A reception side in the operation of communication device 100 in FIG. 1 will be described below. The analog signals received by N antenna elements 145-1 to 145-N pass through duplexers 140-1 to 140-N and are input to power amplifiers 235-1 to 235-N, respectively. Power amplifiers 235-1 to 235-N amplify the power of the analog signals. DCs 230-1 to 230-N down-convert the analog signals from reception frequency bands. ADCs 225-1 to 225-N convert the analog signals (main signals) into digital signals by also using a dither signal. Reception digital precoder 215 performs digital precoding for beamforming on the N inputs, and generates L digital signals respectively corresponding to the L received streams. Reception signal reproduction units 210-1 to 210-L perform error correction decoding and demodulation processing, and reproduce L reception streams from reception signals.

Figure 4:
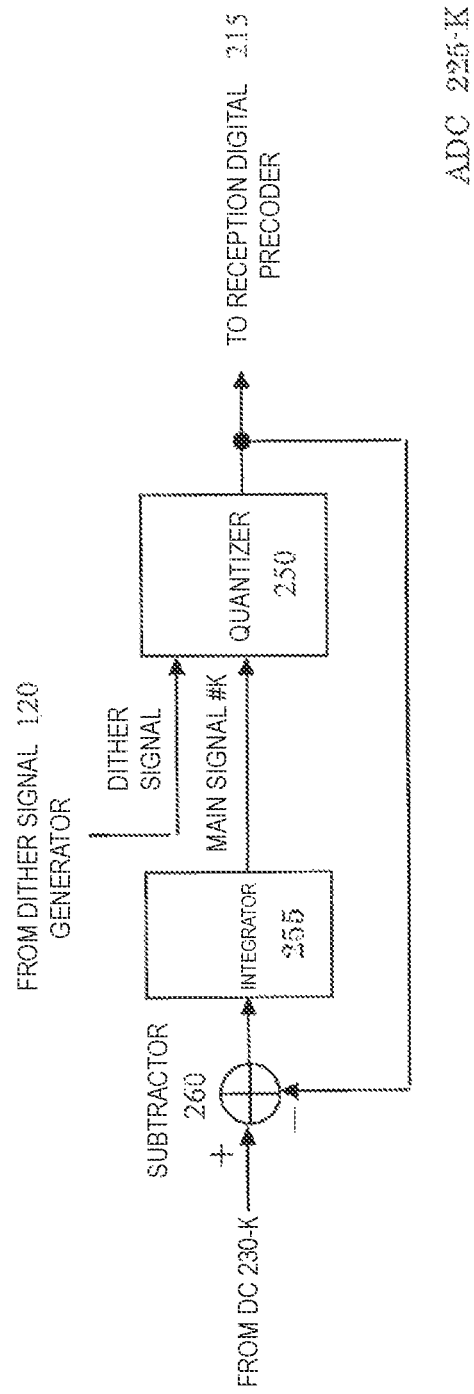
FIG. 4 is a diagram illustrating a configuration of an analog-to-digital converter (ADC) using $\Delta\Sigma$ conversion as an example according to the first exemplary embodiment of the present disclosure.

FIG. 4 is a diagram illustrating a configuration of ADC 225-K using $\Delta\Sigma$ conversion as an example. ADC 225-K includes quantizer 250, integrator 255, and subtractor 260. In ADC 225-K of FIG. 4, subtractor 260 subtracts an output signal of quantizer 250 from the analog signal corresponding to the antenna element K output from DC 230-K. Integrator 255 performs integration processing and outputs analog signals (main signals). Quantizer 250 quantizes for the digital conversion using the analog signals (main signals) and the dither signals output from dither signal generator 120. As described above, ADC 225-K converts the signals into digital signals through $\Delta\Sigma$ conversion and outputs the digital signals to reception digital precoder 215.

Figure 5:
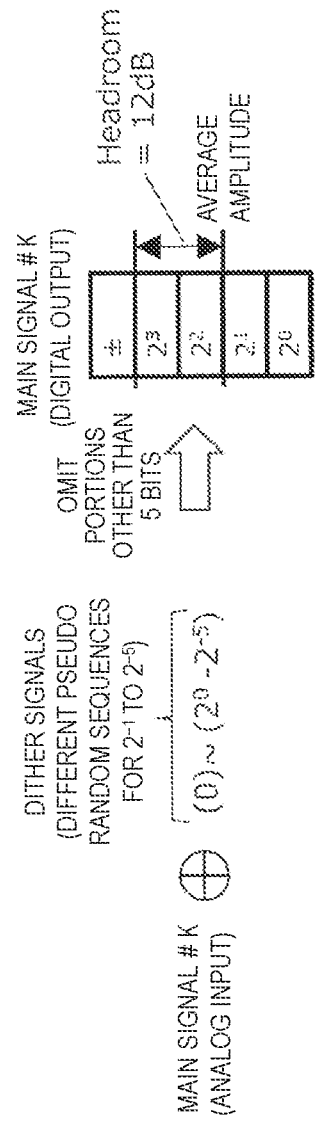
FIG. 5 is a diagram illustrating an example of operations of a quantizer and the dither signal generator according to the first exemplary embodiment of the present disclosure.

FIG. 5 is a diagram illustrating an example of operations of quantizer 250 and dither signal generator 120. In this example, signals to be output from quantizer 250 are 5-bit digital signals. Of the 5-bit digital signals, 1-bit for a sign and 2-bit ($2^3$ to $2^2$) are set above the average amplitude in order to secure 12 dB as a headroom. The remaining 2-bit portions are expressed by $2^1$ to $2^0$. Dither signal generator 120 generates different pseudo random sequences for $2^{-1}$ to $2^{-5}$ as dither signals. Quantizer 250 adds different pseudo random sequences for $2^{-1}$ to $2^{-5}$ to the analog signals (main signals), the pseudo random sequences having power level corresponding to $2^{-1}$ to $2^{-5}$ of digital signals. Quantizer 250 then performs truncation to obtain the higher 5 bit of addition results and outputs the addition results to reception digital precoder 215 as the digital signals. Note that examples of the pseudo random sequences include M sequences and Gold sequences. When 0 and 1 are generated with approximately equal probability, they can be used as dither signals. Therefore, quantizer 250 adds 0 to $2^0$-$2^{-5}$ generated with approximately equal probability to the analog signals (main signals) and performs truncation to obtain the upper 5 bit of addition results.

The above configuration enables generation of the dither signals in a simple method. Therefore, the configuration can provide the receiver that reduces the number of bits of the ADCs while preventing the influence of a quantization error and enables sophisticated and low power beamforming.

Second Exemplary Embodiment

Figure 6:
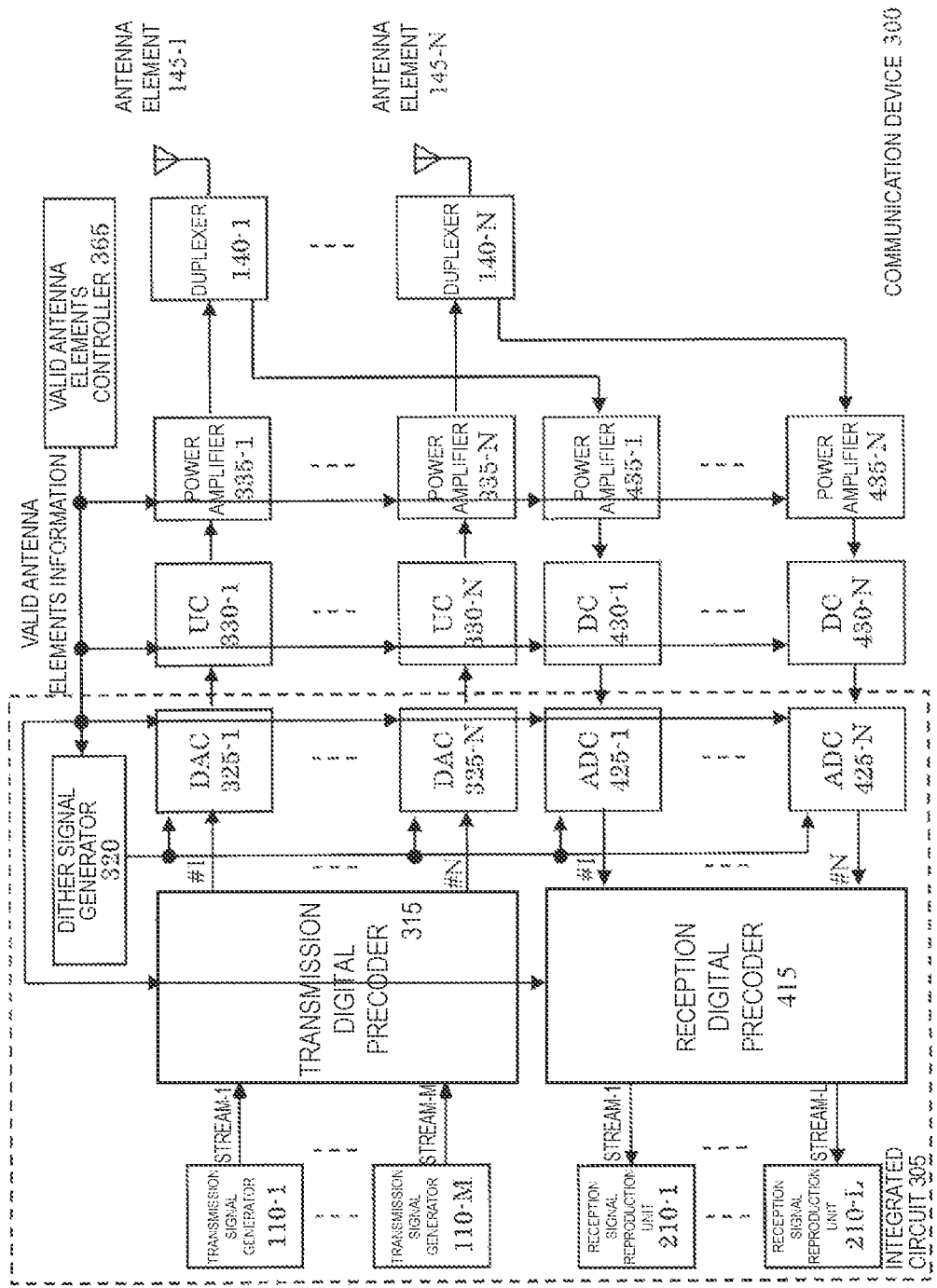
FIG. 6 is a diagram illustrating a configuration of a communication device according to a second exemplary embodiment of the present disclosure.

FIG. 6 is a diagram illustrating a configuration of communication device 300 according to a second exemplary embodiment of the present disclosure. The same components as those of communication device in the first exemplary embodiment are denoted by the same reference numerals, and the description thereof will be omitted. In the second exemplary embodiment, control of a valid antenna element enables sophisticated and low power beamforming.

As compared with communication device 100 in the first exemplary embodiment illustrated in FIG. 1, communication device 300 in FIG. 6 is configured to have transmission digital precoder 315, dither signal generator 320, N DACs 325-1 to 325-N, N UCs 330-1 to 330-N, N power amplifiers 335-1 to 335-N, reception digital precoder 415, N ADCs 425-1 to 425-N, N DCs 430-1 to 430-N, and N power amplifiers 435-1 to 435-N instead of transmission digital precoder 115, dither signal generator 120, N DACs 125-1 to 125-N, N UCs 130-1 to 130-N, N power amplifiers 135-1 to 135-N, reception digital precoder 215, N ADCs 225-1 to 225-N, N DCs 230-1 to 230-N, and N power amplifiers 235-1 to 235-N. Communication device 300 further has valid antenna element controller 365. Note that, in communication device 300, components that perform digital processing may be integrated circuit 305. Examples of the components that perform the digital processing include transmission signal generators 110-1 to 110-M, transmission digital precoder 315, dither signal generator 320, DACs 325-1 to 325-N, reception signal reproduction units 210-1 to 210-L, reception digital precoder 415, and ADCs 425-1 to 425-N. Note that integrated circuit 305 may include not only the components that perform the digital processing but also some or all of the components that perform analog processing.

A transmission side in the operation of communication device 300 in FIG. 3 will be described below. Valid antenna element controller 365 determines valid antenna elements among all the antenna elements in accordance with the channel condition and the remaining battery level of communication device 300, and outputs valid antenna elements information. Each component described below operates based on the valid antenna elements information.

Transmission digital precoder 315 performs digital precoding for beamforming on the M inputs, and generates N digital signals (main signals) respectively corresponding to the N antenna elements. However, transmission digital precoder 315 generates 0 (null) for invalid antenna elements. Dither signal generator 320 generates dither signals. DACs 325-1 to 325-N convert the digital signals into analog signals by also using a dither signal. However, the operation of the DACs with respect to the invalid antenna elements is stopped. As a result, 0 (null) is output. UCs 330-1 to 330-N up-convert the analog signals to transmission frequency bands. However, the operation of the UCs for the invalid antenna elements is stopped. As a result, 0 (null) is output. Power amplifiers 335-1 to 335-N amplify the power of the up-converted analog signals. However, the operation of power amplification for the invalid antenna elements is stopped. As a result, 0 (null) is output.

Figure 7:
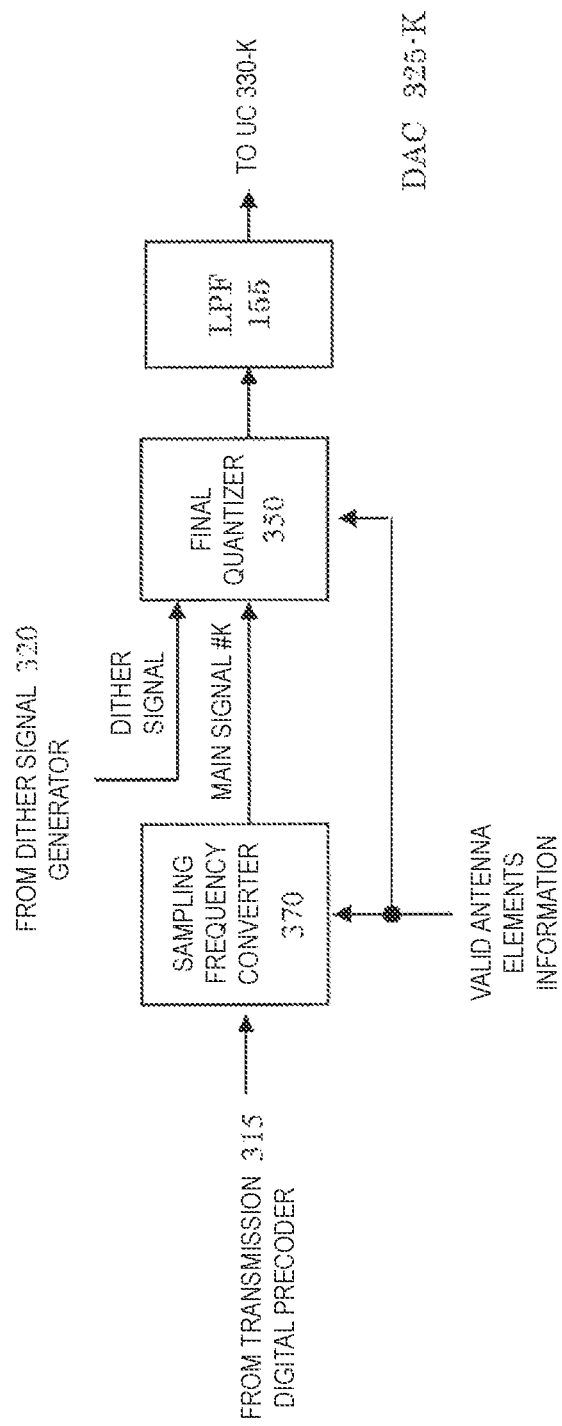
FIG. 7 is a diagram illustrating a configuration of a DAC using $\Delta\Sigma$ conversion as an example in the second exemplary embodiment of the present disclosure.

FIG. 7 is a diagram illustrating a configuration of DAC 325-K using ΔΣ conversion as an example. DAC 325-K has a configuration in which final quantizer 150 is replaced with final quantizer 350 and sampling frequency converter 370 is added, as compared with DAC 125-K in the first exemplary embodiment illustrated in FIG. 2. Each component described below operates based on the valid antenna elements information.

In DAC 325-K of FIG. 7, sampling frequency converter 370 converts the sampling frequency so that the sampling frequency decreases as the number of valid antenna elements increases. For example, when the number of valid antenna elements is changed from 256 to 1024, which is 4 times, the sampling frequency is decreased to ½. Final quantizer 350 performs final quantization before analog conversion using the digital signals (main signals) corresponding to the antenna element K output from transmission digital precoder 315 and the dither signals output from dither signal generator 320. At this time, the larger the number of valid antenna elements, the smaller the number of quantization bits. For example, when the number of valid antenna elements is changed from 256 to 1024, which is 4 times, the number of quantization bits is reduced by 1 bit.

Figure 8:
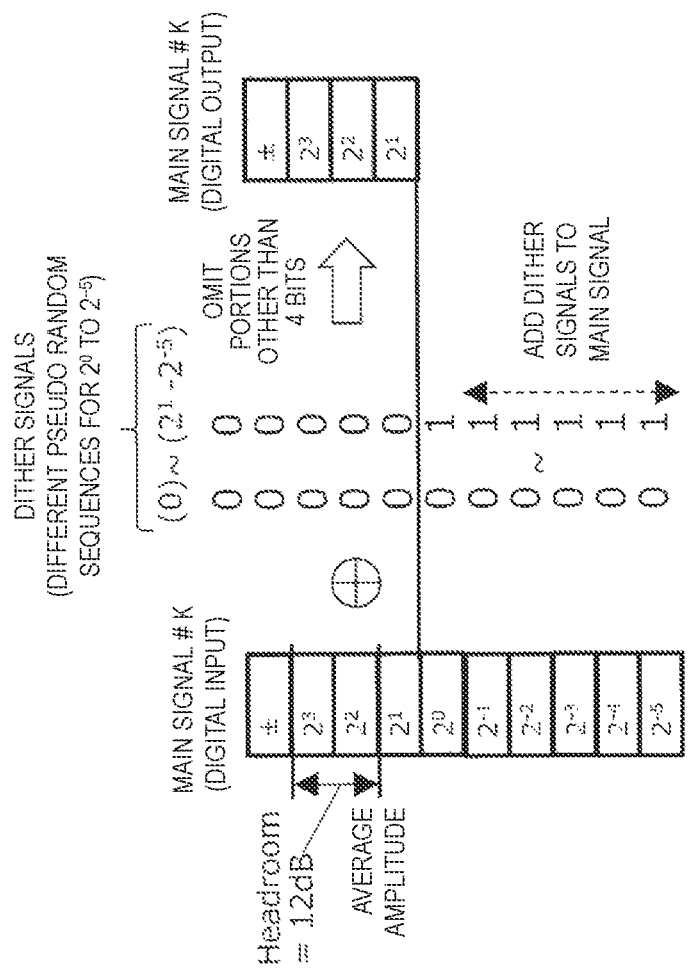
FIG. 8 is a diagram illustrating an example of operations of a final quantizer and a dither signal generator according to the second exemplary embodiment of the present disclosure.

FIG. 8 is a diagram illustrating an example of operations of final quantizer 350 and dither signal generator 320. As in the example in the first exemplary embodiment illustrated in FIG. 3, main signals to be input to final quantizer 350 are 10-bit digital signals. Of the 10-bit digital signals, 1-bit for a sign and 2-bit ($2^3$ to $2^2$) are set above average amplitudes in order to secure 12 dB as a headroom, and the remaining 7-bit portions are expressed by $2^1$ to $2^{-5}$. In the example of the first exemplary embodiment illustrated in FIG. 3, it is assumed that the number of valid antenna elements is 256, and the number of valid antenna elements is changed from 256 to 1024, which is 4 times. Dither signal generator 320 generates different pseudo random sequences for $2^0$ to $2^{-5}$ as dither signals. Final quantizer 350 adds different pseudo random sequences for $2^0$ to $2^{-5}$ to the 10-bit main signals and, truncates lower 6-bit portions, and outputs addition results to LPF 155 as 4-bit digital signals. Note that the pseudo random sequences are, for example, M-sequences or Gold sequences, and can be used as dither signals by generating 0 and 1 with approximately equal probability. Therefore, final quantizer 350 adds 0 to $2^1$-$2^{-5}$ generated with approximately equal probability to the 10-bit main signals, and truncates the lower 6 bit of addition results.

The above configuration can provide a transmitter that changes a sampling rate and the number of bits of the DACs while preventing the influence of a quantization error in accordance with the valid antenna elements information, and enables sophisticated and low power beamforming.

A reception side in the operation of communication device 300 in FIG. 6 will be described below. Each component described below operates based on the valid antenna elements information.

Power amplifiers 435-1 to 435-N amplify the power of the analog signals having passed through duplexers 140-1 to 140-N, respectively. However, the operation of power amplification for the invalid antenna elements is stopped. As a result, 0 (null) is output. DCs 430-1 to 430-N down-convert the analog signals from the reception frequency bands. However, the operation of the UCs for the invalid antenna elements is stopped. As a result, 0 (null) is output. ADCs 425-1 to 425-N convert the analog signals (main signals) into digital signals by also using a dither signal. However, the operation of the ADCs for the invalid antenna elements is stopped. As a result, 0 (null) is output. Reception digital precoder 415 performs digital precoding for beamforming on the N inputs, and generates L digital signals respectively corresponding to the L streams. However, the inputs from the invalid antenna elements are 0 (null). Therefore, beamforming is performed on inputs from valid antenna elements.

Figure 9:
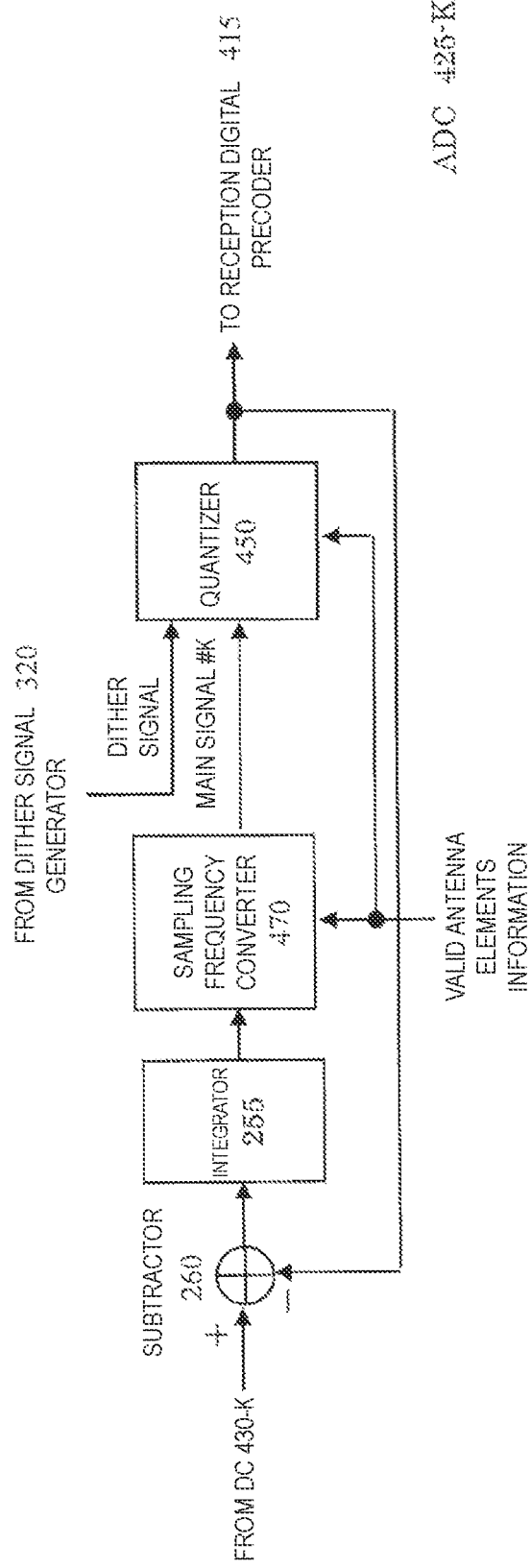
FIG. 9 is a diagram illustrating a configuration of an ADC using $\Delta\Sigma$ conversion as an example according to the second exemplary embodiment of the present disclosure.

FIG. 9 is a diagram illustrating a configuration of ADC 425-K using ΔΣ conversion as an example. The ADC 425-K has a configuration in which quantizer 250 is replaced with quantizer 450 and sampling frequency converter 470 is added as compared with ADC 225-K in the first exemplary embodiment illustrated in FIG. 4. Each component described below operates based on the valid antenna elements information.

In ADC 425-K in FIG. 9, sampling frequency converter 470 converts the sampling frequency so that the sampling frequency decreases as the number of valid antenna elements increases. For example, when the number of valid antenna elements is changed from 256 to 1024, sampling frequency converter 470 decreases the sampling frequency to ½. Quantizer 450 quantizes for the digital conversion using the analog signals (main signals) and the dither signals output from dither signal generator 120. At this time, the larger the number of valid antenna elements, the smaller the number of quantization bits. For example, when the number of valid antenna elements is changed from 256 to 1024, the number of quantization bits is reduced by 1 bit.

Figure 10:
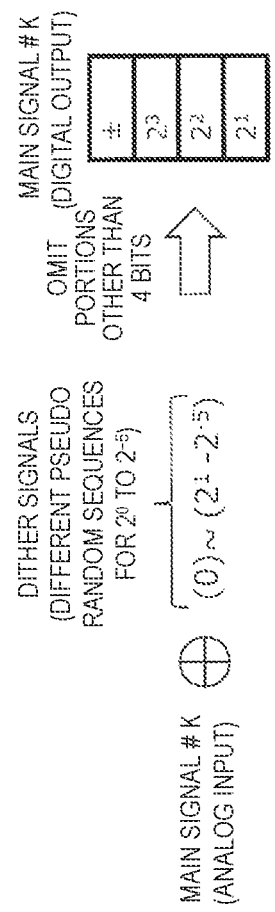
FIG. 10 is a diagram illustrating an example of operations of a quantizer and the dither signal generator according to the second exemplary embodiment of the present disclosure.

FIG. 10 is a diagram illustrating an example of the operations of quantizer 450 and dither signal generator 320. In the example of the first exemplary embodiment illustrated in FIG. 5, the number of valid antenna elements is 256, and the number of valid antenna elements is changed from 256 to 1024, which is 4 times. Dither signal generator 320 generates different pseudo random sequences for $2^0$ to $2^{-5}$ as dither signals. Quantizer 450 adds different pseudo random sequences for $2^0$ to $2^{-5}$ to analog signals (main signals), the pseudo random sequences having power level corresponding to $2^0$ to $2^{-5}$ of digital signals, truncates portions other than higher 4 bits, and outputs addition results to reception digital precoder 415 as the digital signals. Note that the pseudo random sequences are, for example, M-sequences or Gold sequences, and can be used as dither signals by generating 0 and 1 with approximately equal probability. Therefore, quantizer 450 adds 0 to $2^1 \cdot 2^{-5}$ generated with approximately equal probability to the analog signals (main signals) and performs truncation to obtain upper-4-bit portions.

The above configuration can provide a receiver that changes a sampling rate and the number of bits of the ADCs while preventing the influence of a quantization error in accordance with the valid antenna elements information, and enables sophisticated and low power beamforming.

Third Exemplary Embodiment

Figure 11:
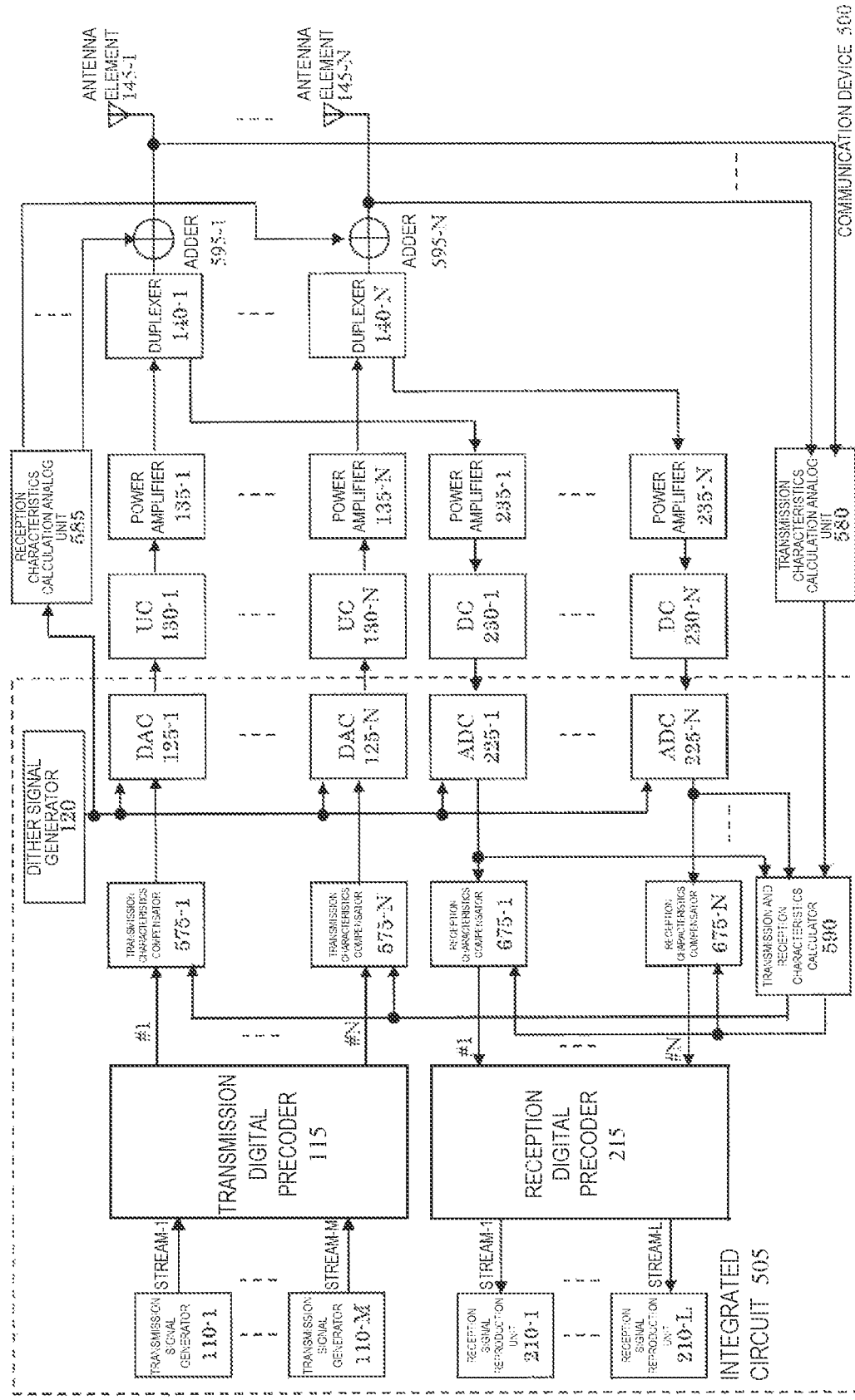
FIG. 11 is a diagram illustrating a configuration of a communication device according to a third exemplary embodiment of the present disclosure.

FIG. 11 is a diagram illustrating a configuration of communication device 500 according to a third exemplary embodiment of the present disclosure. The same components as those of communication device according to the first exemplary embodiment are denoted by the same reference numerals, and the description thereof will be omitted. In the third exemplary embodiment, the beamforming performance is kept constant by high-speed and real-time calibration by using both calibration signals and dither signals.

As compared with communication device 100 in the first exemplary embodiment illustrated in FIG. 1, communication device 500 in FIG. 11 has a configuration further including N transmission characteristics compensators 575-1 to 575-N, transmission characteristics calculation analog unit 580, reception characteristics calculation analog unit 585, transmission and reception characteristics calculator 590, N adders 595-1 to 595-N, and N reception characteristics compensators 675-1 to 675-N. Note that, in communication device 500, components that perform digital processing may be integrated circuit 505. Examples of the components that perform the digital processing include transmission signal generators 110-1 to 110-M, transmission digital precoder 115, dither signal generator 120, DACs 125-1 to 125-N, reception signal reproduction units 210-1 to 210-L, reception digital precoder 215, ADCs 225-1 to 225-N, transmission characteristics compensators 575-1 to 575-N, transmission and reception characteristics calculator 590, and reception characteristics compensators 675-1 to 675-N. Note that integrated circuit 505 may include not only components that perform the digital processing but also some or all of the components that perform analog processing.

A transmission side in the operation of communication device 500 in FIG. 11 will be described below. Transmission characteristics compensators 575-1 to 575-N perform calibration between elements by compensating characteristics of the digital signals (main signals) output from transmission digital precoder 115, based on the transmission characteristics compensation amount signal output from transmission and reception characteristics calculator 590. After the output signals from transmission characteristics compensators 575-1 to 575-N pass through DACs 125-1 to 125-N, UCs 130-1 to 130-N, power amplifiers 135-1 to 135-N, duplexers 140-1 to 140-N, and adders 595-1 to 595-N, transmission characteristics calculation analog unit 580 performs processing to be described later. Note that, in communication device 500, in a case where the transmission and reception frequencies are different from each other, only the signal on the transmission side is output from transmission characteristics calculation analog unit 580. Transmission and reception characteristics calculator 590 calculates transmission characteristics using the output signal from transmission characteristics calculation analog unit 580.

Figure 12:
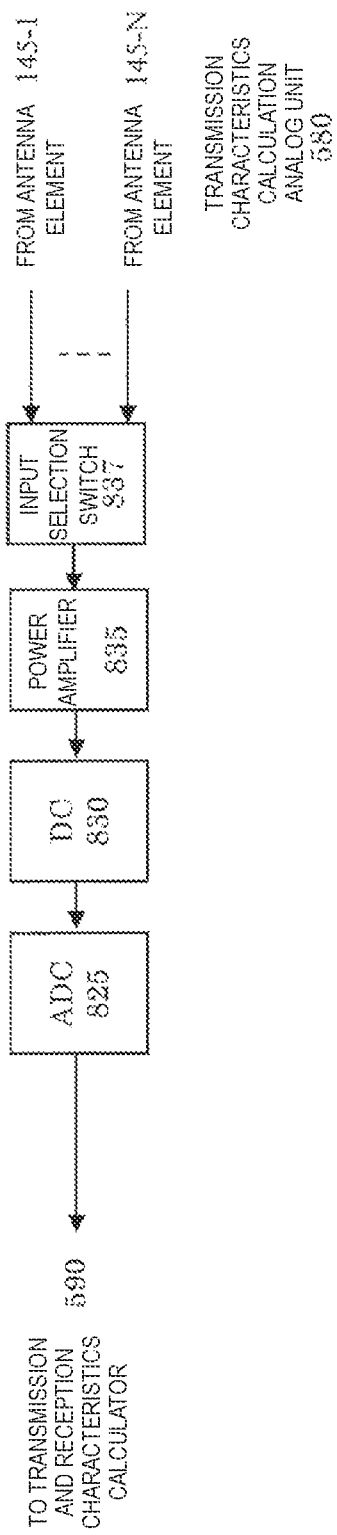
FIG. 12 is a diagram illustrating a configuration of a transmission characteristics calculation analog unit according to the third exemplary embodiment of the present disclosure.

FIG. 12 is a diagram illustrating a configuration of transmission characteristics calculation analog unit 580. Transmission characteristics calculation analog unit 580 includes ADC 825, DC 830, power amplifier 835, and input selection switch 837. Input selection switch 837 sequentially selects one of N antenna elements 145-1 to 145-N and performs output. Power amplifier 835 amplifies the power of analog signals. As with DCs 230-1 to 230-N, DC 830 downconverts the analog signals from the reception frequency bands. ADC 825 converts the analog signals into digital signals.

Figure 13:
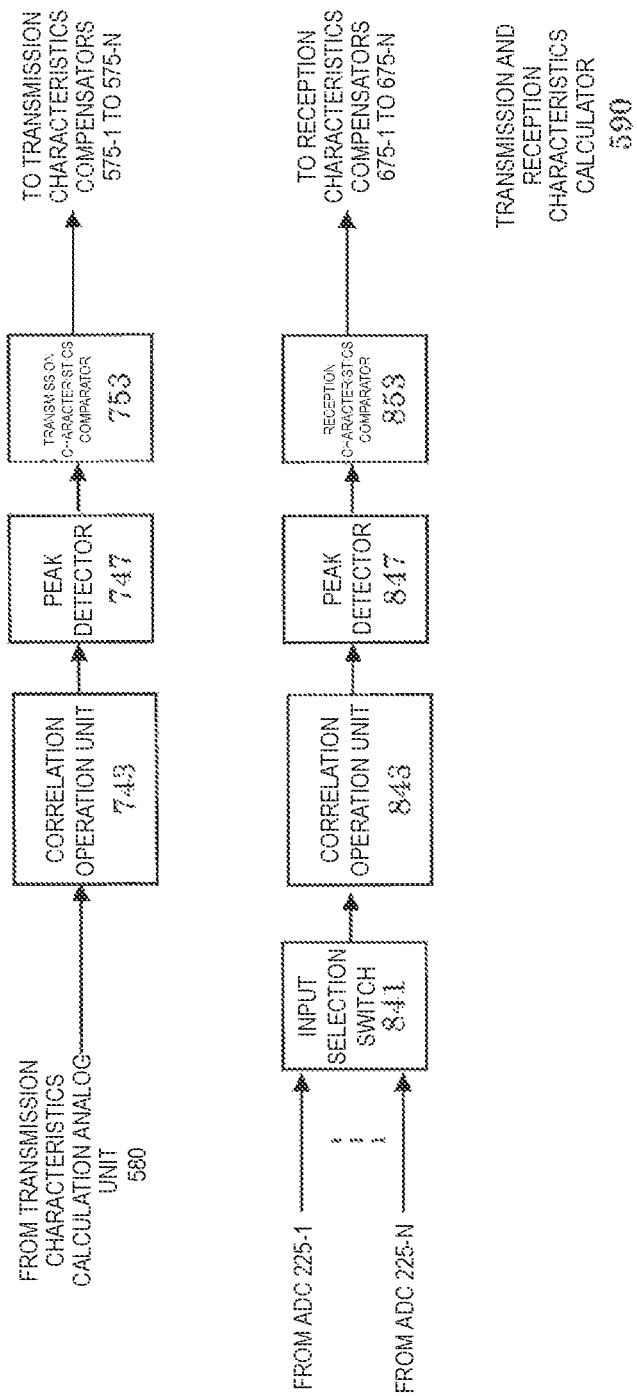
FIG. 13 is a diagram illustrating a configuration of a transmission and reception characteristics calculator according to the third exemplary embodiment of the present disclosure.

FIG. 13 is a diagram illustrating a configuration of transmission and reception characteristics calculator 590. Transmission and reception characteristics calculator 590 includes correlation operation units 743, 843, peak detectors 747, 847, transmission characteristics comparator 753, reception characteristics comparator 853, and input selection switch 841. Correlation operation unit 743 performs correlation operation between the digital signals output from transmission characteristics calculation analog unit 580 and the pseudo random sequences for the most significant bit ($2^{-1}$) generated by dither signal generator 120. Peak detector 747 detects peak values of the pseudo random sequences within one period and performs correlation operation for a plurality of periods as necessary to obtain desired correlation gains. Outputs from transmission characteristics calculation analog unit 580 are sequentially switched for N antenna elements 145-1 to 145-N. Transmission characteristics comparator 753 compares the characteristics of N antenna elements 145-1 to 145-N, and outputs the respective transmission characteristics compensation amounts to transmission characteristics compensators 575-1 to 575-N so that all the characteristics are identical to each other.

The above configuration can provide a transmitter in which the beamforming performance can be kept constant by high speed and real-time calibration by using common signals for both calibration and dither. That is, the power level of calibration signals can be set to be large by applying signals that can be used also as both the calibration signals and the dither signals to the most significant bit ($2^{-1}$) of the dither signals, and high speed and real-time calibration is enabled by reducing the desired correlation gains.

A reception side in the operation of communication device 500 of FIG. 11 will be described below. Reception characteristics calculation analog unit 585 performs analog processing on the dither signals output from dither signal generator 120 to generate high-frequency analog signals for antenna elements 145-1 to 145-N. Adders 595-1 to 595-N add the high-frequency analog signals to the analog signals received by N antenna elements 145-1 to 145-N, respectively. Outputs from adders 595-1 to 595-N pass through duplexers 140-1 to 140-N, power amplifiers 235-1 to 235-N, DCs 230-1 to 230-N, and ADCs 225-1 to 225-N, respectively. Transmission and reception characteristics calculator 590 calculates reception characteristics using the output signals from ADCs 225-1 to 225-N, and generates reception characteristics compensation amount signals. Reception characteristics compensators 675-1 to 675-N perform calibration between elements by compensating the characteristics of the digital signals output from ADCs 225-1 to 225-N, respectively, based on the reception characteristics compensation amount signals output from transmission and reception characteristics calculator 590.

Figure 14:
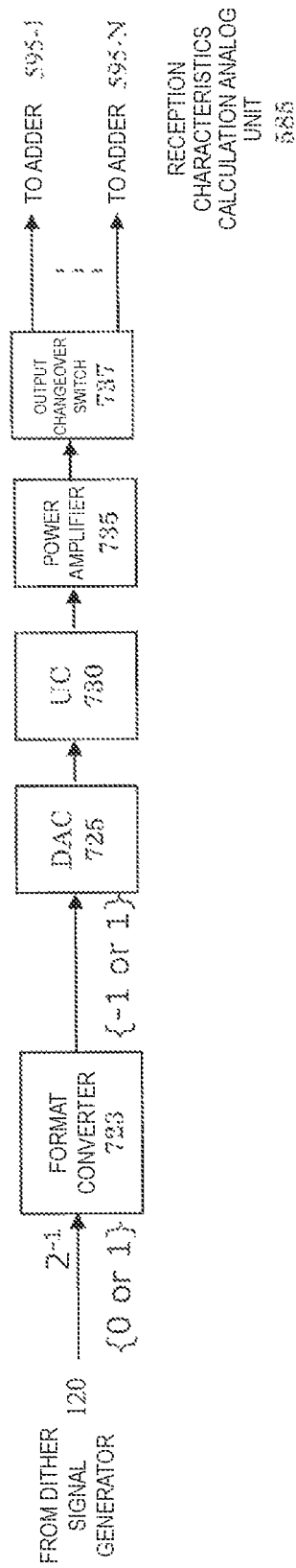
FIG. 14 is a diagram illustrating a configuration of a reception characteristics calculation analog unit according to the third exemplary embodiment of the present disclosure.

FIG. 14 is a diagram illustrating a configuration of reception characteristics calculation analog unit 585. Reception characteristics calculation analog unit 585 includes format converter 723, DAC 725, UC 730, power amplifier 735, and output changeover switch 737. Format converter 723 converts the format {0 or 1} of the pseudo random sequence for the most significant bit ($2^{-1}$) generated by dither signal generator 120 into {−1 or 1}. DAC 725 converts the digital signals into analog signals. As with UCs 130-1 to 130-N, UC 730 up-converts analog signals to transmission frequency bands. As with power amplifiers 135-1 to 135-N, the power amplifier 735 amplifies the power of the up-converted analog signals. Output changeover switch 737 sequentially selects and outputs one of the outputs from adders 595-1 to 595-N, and outputs 0 (null) for all the other outputs. The above operation allows adders 595-1 to 595-N to add the pseudo random sequences for $2^{-1}$ to the analog signals (main signals) received by N antenna elements 145-1 to 145-N, the pseudo random sequences having power level corresponding to $2^{-1}$ of the digital signals.

In transmission and reception characteristics calculator 590 of FIG. 13, input selection switch 841 selects and outputs the calibration signals output from reception characteristics calculation analog unit 585 among the outputs from ADCs 225-1 to 225-N. Correlation operation unit 843 performs correlation operation between the digital signals output from input selection switch 841 and the pseudo random sequences for the most significant bit ($2^{-1}$) generated by dither signal generator 120. Peak detector 847 detects peak values of the pseudo random sequences within one period, and obtains desired correlation gains by performing correlation operation for a plurality of periods as necessary. The outputs from reception characteristics calculation analog unit 585 are sequentially switched for N antenna elements 145-1 to 145-N. Reception characteristics comparator 853 compares the characteristics of N antenna elements 145-1 to 145-N, and outputs the respective reception characteristics compensation amounts to reception characteristics compensators 675-1 to 675-N so that all the characteristics are identical to each other.

The above configuration can provide a receiver in which the beamforming performance can be kept constant by high speed and real-time calibration by using common signals for both calibration and dither. That is, the power level of calibration signals can be set to be large by applying signals that can be used also as both the calibration signals and the dither signals to the most significant bit ($2^{-1}$) of the dither signals, and high speed and real-time calibration is enabled by reducing the desired correlation gains.

(Supplementary)

Although the exemplary embodiments have been described above with reference to the drawings, the present disclosure is not limited to the contents described in the first to third exemplary embodiments, and can be implemented in any form for achieving the object of the present disclosure and an object related to or associated with the object. Thus, the present disclosure, for example, may be as follows.

(1) In the first to third exemplary embodiments, the configuration of the full digital beamforming has been described, but the present disclosure is not limited thereto, and the configuration of the hybrid beamforming may be used. Even in this case, a similar effect can be obtained.

(2) In the first to third exemplary embodiments, the quantization of the DACs and ADCs is performed by adding the pseudo random sequence {0 or 1} to the lower bits and then truncating the lower bits. However, the present disclosure is not limited to this, and the quantization may be performed by another method, for example, by converting the pseudo random sequence {0 or 1} into {−1 or 1}, and rounding after addition. Before addition, the lower bits together with the upper bits may be set as negative values in a case where the lower bit group indicates negative values.

(3) In the second exemplary embodiment, the sampling frequency is reduced to ½ when the number of valid antenna elements is changed from 256 to 1024, which is 4 times. However, the present disclosure is not limited to this, and the degree of change in the number of elements and the degree of change in the sampling frequency may be determined by another formula or the like.

(4) In the second exemplary embodiment, when the number of valid antenna elements is changed from 256 to 1024, which is 4 times, the number of quantization bits of the DACs and ADCs is reduced by 1 bit. However, the present disclosure is not limited to this, and the degree of change in the number of elements and the degree of change in the number of quantization bits may be determined by another formula or the like.

(5) Some of the first to third exemplary embodiments may be combined with each other.

(6) In the first to third exemplary embodiments, the notation "unit" used for each component may be replaced with another notation such as "circuit (circuitry)", "assembly", "device", or "module".

(7) The present disclosure may relate to implementation using hardware and software. The above exemplary embodiments may be implemented or executed by using a computing device (processor). The computing device or processor may be, for example, a main processor/general purpose processor, a digital signal processor (DSP), an application specific integrated circuit (ASIC), a field programmable gate array (FPGA), other programmable logic device, or the like. The above exemplary embodiments may be implemented or achieved by combining these devices.

(8) The first to third exemplary embodiments may be achieved by a software module mechanism executed by a processor or directly by hardware. Further, a combination of a software module and a hardware implementation is also possible. The software module may be stored on various types of computer-readable storage media, such as a random access memory (RAM), an erasable programmable read-only memory (EPROM), an electrically erasable programmable read-only memory (EEPROM), a flash memory, a register, a hard disk, a CD-ROM, a DVD, and the like.

(9) On the reception side in the first to third exemplary embodiments, the number of bits of the ADCs is reduced by using the pseudo random sequences as the dither signals. However, the present disclosure is not limited to this, and the number of bits of the ADCs may be reduced by using thermal noises generated in the analog unit as the dither signals without using the pseudo random sequences.

The present disclosure can be applied not only to the HAPS but also to the beamforming technology in wireless transmission.

What is claimed is:

1. A transmitter that supports beamforming function using a plurality of antenna elements, the transmitter comprising:
   a dither signal generator which, in operation, generates pseudo random sequence signals as dither signals for lower bits of digital signals, the pseudo random sequence signals being different from each other, the digital signals each corresponding to respective one of the plurality of antenna elements; and
   a plurality of digital-to-analog converters which, in operation, adds the dither signals generated by the dither signal generator to the lower bits of the digital signals, and converts only upper bits of addition results of the digital signals and the dither signals into analog signals.

2. The transmitter according to claim 1, further comprising a valid antenna elements controller which, in operation, determines valid antenna elements that are valid among the plurality of antenna elements, and outputs valid antenna elements information corresponding to the determined valid antenna elements,
   wherein the plurality of digital-to-analog converters, in operation, determines the number of the lower bits of the digital signals based on the valid antenna elements information.

3. The transmitter according to claim 2, wherein the plurality of digital-to-analog converters, in operation, determines a sampling frequency based on the valid antenna elements information, and converts the digital signals into the analog signals after converting the sampling frequency based on the determined sampling frequency.

4. The transmitter according to claim 2, further comprising a digital precoder which, in operation, outputs the digital signals only for the valid antenna elements based on the valid antenna elements information,
   wherein the valid antenna elements controller, in operation, based on the valid antenna elements information, causes digital-to-analog converters only for the valid antenna elements to operate among the plurality of digital-to-analog converters, and performs analog processing only for the valid antenna elements among analog processing after the plurality of digital-to-analog converters.

5. The transmitter according to claim 1, further comprising:
   an analog-to-digital converter which, in operation, sequentially converts the analog signals into digital signals, the analog signals each corresponding to respective one of the plurality of antenna elements;
   a transmission characteristics calculator which, in operation, performs a correlation operation between pseudo random sequence signals assigned to most significant bits among the pseudo random sequence signals as the dither signals generated by the dither signal generator and the digital signals output from the plurality of analog-to-digital converters to sequentially calculate transmission characteristics for each of the plurality of antenna elements, and generates a transmission characteristics compensation amount for each of the plurality of antenna elements based on the transmission characteristics for each of the plurality of antenna elements; and
   a transmission characteristics compensator which, in operation, compensates the transmission characteristics for each of the plurality of antenna elements based on the transmission characteristics compensation amount output from the transmission characteristics calculator.

6. A receiver that supports beamforming function using a plurality of antenna elements, the receiver comprising:
   a dither signal generator which, in operation, generates pseudo random sequence signals as dither signals for analog signals, the pseudo random sequence signals being different from each other, the analog signals each corresponding to respective one of the plurality of antenna elements; and
   a plurality of analog-to-digital converters which, in operation, receives the analog signals and the dither signals, adds the dither signals to the analog signals, the dither signals having power level corresponding to lower bits of digital signals, and converts only portions of addition results of the analog signals and the dither signal into the digital signals, the portions corresponding to upper bits of the digital signals, and outputs the digital signals.

7. The receiver according to claim 6, wherein
   the plurality of analog-to-digital converters includes subtractors, integrators, and quantizers,
   the subtractors, in operation, subtract output signals of the quantizers from signals each corresponding to respective one of the plurality of antenna elements,
   the integrators, in operation, integrate output signals from the subtractors and output the analog signals, and
   the quantizers, in operation, receive the analog signals and the dither signals and output the digital signals.

8. The receiver according to claim 6, further comprising a valid antenna elements controller which, in operation, determines valid antenna elements that are valid among the plurality of antenna elements, and outputs valid antenna elements information corresponding to the determined valid antenna elements,
   wherein the plurality of analog-to-digital converters, in operation, determines the number of the lower bits of the digital signals based on the valid antenna elements information.

9. The receiver according to claim 8, wherein the plurality of analog-to-digital converters, in operation, determines a sampling frequency based on the valid antenna elements information, and converts the analog signals into the digital signals after conversion of the sampling frequency based on the determined sampling frequency.

10. The receiver according to claim 8, further comprising a digital precoder which, in operation, uses signals only for the valid antenna elements based on the valid antenna elements information,
wherein the valid antenna elements controller, in operation, based on the valid antenna elements information, causes analog-to-digital converters only for the valid antenna elements to operate among the plurality of analog-to-digital converters, and performs analog processing only for the valid antenna elements among analog processing before the plurality of analog-to-digital converters.

11. The receiver according to claim 6, further comprising:
a plurality of digital-to-analog converters which, in operation, sequentially converts, into analog signals, pseudo random sequence signals assigned to most significant bits among the pseudo random sequence signals generated by the dither signal generator, and sequentially outputs the analog signals to the plurality of antenna elements;
a plurality of adders which, in operation, adds analog reception signals and the analog signals output from the plurality of digital-to-analog converters, the analog reception signals each corresponding to respective one of the plurality of antenna elements;
a reception characteristics calculator which, in operation, performs a correlation operation between pseudo random sequence signals assigned to most significant bits among the pseudo random sequence signals as the dither signals generated by the dither signal generator and the digital signals output from the analog-to-digital converters to sequentially calculate reception characteristics for each of the plurality of antenna elements, and generates a reception characteristics compensation amount for each of the plurality of antenna elements based on the reception characteristics for each of the plurality of antenna elements; and
a reception characteristics compensator which, in operation, compensates the reception characteristics for each of the plurality of antenna elements based on the reception characteristics compensation amount output from the reception characteristics calculator.

12. A transmission method of supporting beamforming function using a plurality of antenna elements, the transmission method comprising:
generating pseudo random sequence signals as dither signals for lower bits of digital signals, the pseudo random sequence signals being different from each other, the digital signals each corresponding to respective one of the plurality of antenna elements; and
adding the dither signals generated by the generating of the pseudo random sequence signals to the lower bits of the digital signals, and converting only upper bits of addition results of the digital signals and the dither signals into analog signals.

13. The transmission method according to claim 12, further comprising:
determining valid antenna elements that are valid among the plurality of antenna elements, and outputting valid antenna elements information corresponding to the determined valid antenna elements,
wherein the converting of the digital signals into the analog signals includes determining the number of the lower bits of the digital signals based on the valid antenna elements information.

14. The transmission method according to claim 12, further comprising:
sequentially converting the analog signals into digital signals, the analog signals each corresponding to respective one of the plurality of antenna elements;
performing correlation operation between pseudo random sequence signals assigned to most significant bits among the pseudo random sequence signals as the dither signals generated by the generating of the pseudo random sequence signals and the digital signals obtained by the converting of the analog signals and the digital signals to sequentially calculate transmission characteristics for each of the plurality of antenna elements, and generating a transmission characteristics compensation amount for each of the plurality of antenna elements based on the transmission characteristics for each of the plurality of antenna elements; and
compensating the transmission characteristics for each of the plurality of antenna elements based on the transmission characteristics compensation amount generated by the generating of the transmission characteristics compensation amount.

15. A reception method of supporting beamforming function using a plurality of antenna elements, the reception method comprising:
generating pseudo random sequence signals as dither signals for analog signals, the pseudo random sequence signals being different from each other, the analog signals each corresponding to respective one of the plurality of antenna elements; and
receiving the analog signals and the dither signals, adding the dither signals to the analog signals, the dither signals having power level corresponding to lower bits of digital signals, converting only portions of addition results of the analog signals and the dither signals into the digital signals, the portions corresponding to upper bits of the digital signals, and outputting the digital signals.

16. The reception method according to claim 15, further comprising:
determining valid antenna elements that are valid among the plurality of antenna elements, and outputting valid antenna elements information corresponding to the determined valid antenna elements,
wherein the converting of the analog signals into the digital signals includes determining the number of the lower bits of the digital signals based on the valid antenna elements information.

17. The reception method according to claim 15, further comprising:
sequentially converting, into analog signals, pseudo random sequence signals assigned to most significant bits among the pseudo random sequence signals generated by the generating of the pseudo random sequence signals, and sequentially outputting the analog signals to the plurality of antenna elements;
adding analog reception signals and the analog signals obtained by the converting of the digital signals into the analog signals, the analog reception signals each corresponding to respective one of the plurality of antenna elements;
performing a correlation operation between the pseudo random sequence signals assigned to the most significant bits among the pseudo random sequence signals as the dither signals generated by the generating of the pseudo random sequence signals and the digital signals obtained by the converting of the analog signals into the digital signals to sequentially calculate reception characteristics for each of the plurality of antenna elements, and generating a reception characteristics compensation amount for each of the plurality of antenna elements based on the reception characteristics for each of the plurality of antenna elements; and compensating the reception characteristics for each of the plurality of antenna elements based on the reception characteristics compensation amount generated by the generating of the reception characteristics compensation amount.

18. A non-transitory computer readable storage medium recording a program for causing a computer to execute the transmission method according to claim 12.

19. A non-transitory computer readable storage medium recording a program for causing a computer to execute the reception method according to claim 15.

20. An integrated circuit that supports beamforming function using a plurality of antenna elements, the integrated circuit comprising:

a dither signal generator which, in operation, generates pseudo random sequence signals as dither signals for lower bits of digital signals, the pseudo random sequence signals being different from each other, the digital signals each corresponding to respective one of the plurality of antenna elements; and a plurality of digital-to-analog converters which, in operation, adds the dither signals generated by the dither signal generator to the lower bits of the digital signals, and converts only upper bits of addition results of the digital signals and the dither signals into analog signals.

21. An integrated circuit that supports beamforming function using a plurality of antenna elements, the integrated circuit comprising:

a dither signal generator which, in operation, generates pseudo random sequence signals as dither signals for analog signals, the pseudo random sequence signals being different from each other, the analog signals each corresponding to respective one of the plurality of antenna elements; and a plurality of analog-to-digital converters which, in operation, receives the analog signals and the dither signals, adds the dither signals to the analog signals, the dither signals having power level corresponding to lower bits of digital signals, and converts only portions of addition results of the analog signals and the dither signal into the digital signals, the portions corresponding to upper bits of the digital signals, and outputs the digital signals.

* * * * *